United States Patent [19]
Sonderegger et al.

[11] Patent Number: 6,152,436
[45] Date of Patent: Nov. 28, 2000

[54] COUPLING ASSEMBLY FOR A MACHINING DEVICE

[75] Inventors: Peter Sonderegger, Flawil; Walter Roth, St. Gallen, both of Switzerland

[73] Assignee: Mecatool AG, Switzerland

[21] Appl. No.: 09/136,130

[22] Filed: Aug. 18, 1998

[30] Foreign Application Priority Data

Aug. 21, 1997 [CH] Switzerland ............................ 1954/97

[51] Int. Cl.[7] .................................................. B23Q 3/00
[52] U.S. Cl. ............... 269/310; 204/297.06; 204/297.14; 204/224.17; 219/69.11; 219/69.12
[58] Field of Search ............ 204/297 R, 297.01–297.09, 204/297.1, 297.11–297.16, 224 M; 219/69.11, 62.12; 269/309, 310

[56] References Cited

U.S. PATENT DOCUMENTS

| | | | |
|---|---|---|---|
| 3,961,780 | 6/1976 | Saj | 269/64 |
| 4,534,546 | 8/1985 | Cattani | 269/58 |
| 4,575,062 | 3/1986 | Mudge et al. | 269/64 |
| 4,622,449 | 11/1986 | Inoue | 219/69 R |
| 4,638,141 | 1/1987 | Houman et al. | 219/69 R |
| 4,643,410 | 2/1987 | Mudge et al. | 269/64 |
| 4,688,974 | 8/1987 | Wright et al. | 409/219 |
| 4,838,533 | 6/1989 | Buchler | 269/310 |
| 5,190,272 | 3/1993 | Zika et al. | 269/309 |
| 5,370,378 | 12/1994 | Weber et al. | 269/309 |
| 5,415,384 | 5/1995 | Obrist et al. | 269/309 |

*Primary Examiner*—Kathryn Gorgos
*Assistant Examiner*—Christopher Keehan
*Attorney, Agent, or Firm*—Gifford, Krass, Groh, Sprinkle, Anderson & Citkowski, P.C.

[57] ABSTRACT

A coupling assembly for a machining tool is proposed that serves for mounting a work piece in a torsionally fixed manner. The work piece is received on a pallet that is located on a pallet support member. The pallet and the pallet support member are provided with cooperating means for exactly positioning the pallet on the pallet support member in the horizontal as well in the vertical plane.

4 Claims, 3 Drawing Sheets

COUPLING ASSEMBLY FOR A MACHINING DEVICE

BACKGROUND OF THE INVENTION

The present invention refers to a coupling assembly for a machining device, e.g. a machine tool, such as an electro erosive machine tool, for mounting a work piece to be machined in a torsionally fixed manner. Thereby, the machining device is provided with a pallet support member, and the work piece is disposed on a pallet. The pallet has to be exactly positioned in the X-, Y- and Z-directions and, thereafter, has to be fixed to the pallet support member in an exactly centered position.

It is understood that exceptionally high demands are made not only as far as the exact positioning in the horizontal and vertical planes as well as the exact keeping of a central position are concerned, but it must also be ensured that the work piece can be clamped repeatedly in a well defined position, in the case that, if appropriate, several machining or measuring operations have to be performed on the same work piece.

In order to ensure a precise machining of the work piece, it is of paramount importance to withstand the loads occurring during machining, e.g. high rinsing pressures, by means of a rigid fixation.

Due to the fact that a measurement accuracy in the region of thousands of a millimeter has to be observed in connection with such coupling assemblies, the repositioning of work pieces is extremely time consuming and expensive.

OBJECTS OF THE INVENTION

It is an object of the present invention to provide a coupling assembly by means of which a high positioning accuracy and stability of the work piece palletized in the work region of a machine tool can be realized. Thereby, the particular machining conditions during the machining of a work piece by means of an electro erosive machining device shall be taken into account.

SUMMARY OF THE INVENTION

To meet these and other objects, the present invention provides a coupling assembly to be used in a machine tool, particularly in an electro erosive machine tool, for mounting a work piece to be machined in a torsionally fixed manner. The coupling assembly comprises a pallet adapted to hold the work piece to be machined, a pallet support member, whereby the pallet is positioned on that pallet support member, a swiveling pallet member, whereby the pallet support member is operationally coupled to that swiveling pallet member, and means associated with the pallet support member and the swiveling pallet member and adapted to provide for a resilient centering and leveling, respectively, of the pallet and, thereby, the work piece.

It is of particular advantage if the pallet, aligned and centered in three dimensions, is supported on the pallet support member by means of a resilient centering device. Also of great advantage is the provision of an adjustment device in the pallet for providing a vertical adjustment of the work piece by means of a dove-tailed guide member.

According to a preferred embodiment, the pallet support member is provided with an alignment surface for aligning the pallet member with regard to the pallet support member. Thereby, the alignment surface can be provided with alignment cam members that are disposed and distributed, respectively, in such a way that in each case two opposite cam members in cooperation with guide channels provided in the pallets exactly determine the X- and the Y-direction, while rest head members are provided in the region of the corners of the alignment surface that determine the orientation of the pallet in Z-direction.

Thanks to the resilient centering in X- and Y-directions, combined with the rigid support in Z-direction, vibrations of the work piece that could occur during the machining thereof, can be avoided reliably.

BRIEF DESCRIPTION OF THE DRAWINGS

In the following, an embodiment of the coupling assembly according to the invention will be further described, with reference to the accompanying drawings, in which.

DETAILED DESCRIPTION OF A PREFERRED EMBODIMENT

Figure 1:
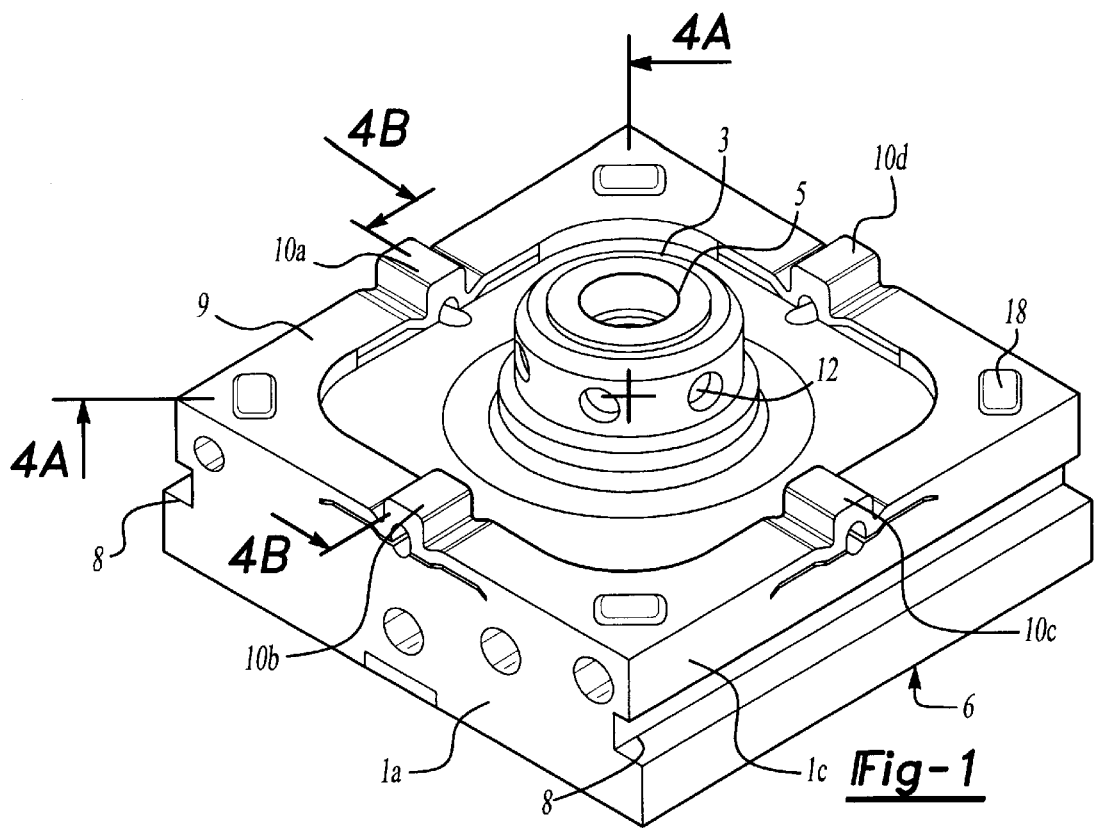
FIG. 1 shows a perspective view of a pallet support member.
Figure 2:
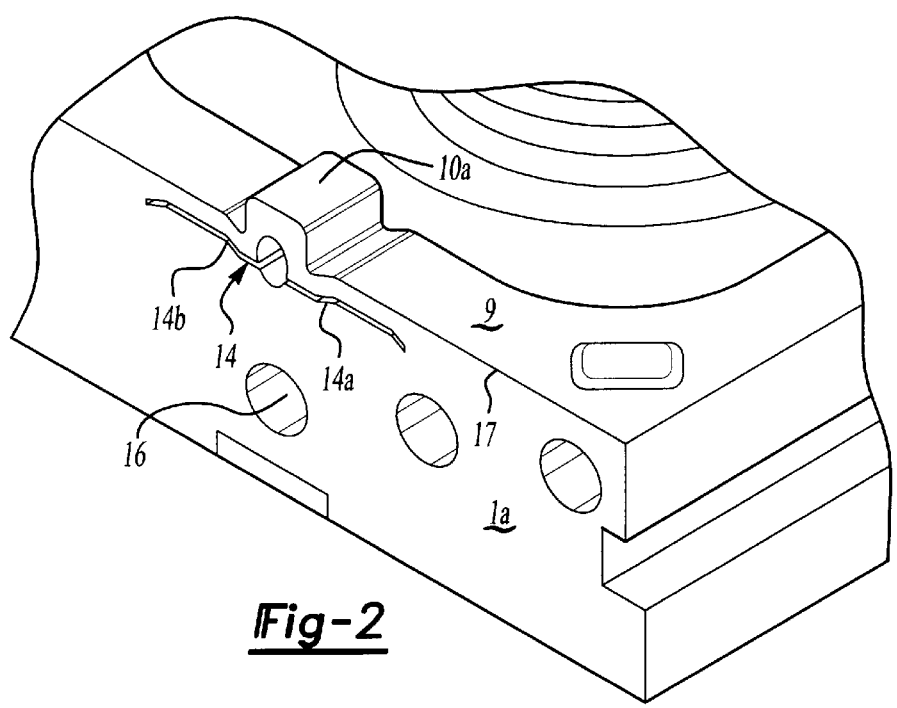
FIG. 2 shows an enlarged view of the cam member portion of the pallet support member.

The coupling assembly according to the invention includes a pallet support member that is rigidly located on a machining device and a pallet member that is designed as a support for a work piece or a similar device. Particularly, in the FIGS. 1–3, there is shown a pallet support member that comprises a rectangular body member 1 having a central opening in which a flat piston member (not shown) is inserted; the piston member is secured against rotation by means of a pin (not shown). Moreover, the flat piston member is provided with a piston rod (not shown) that is surrounded by a ball sleeve member 2. Close to the piston rod, a clamping cone member 5 is fixed by means of a screw (not shown). Along the periphery of the ball sleeve member 2, six ball members 12 are provided that are located in corresponding recesses. The six ball members 12 are evenly distributed along the circumference of the ball sleeve member 2. Designated by reference numeral 6 is a bottom plate member of the body member 1, the bottom plate member 6 being fixed to the body member 1 by means of screws (not shown).

Two parallel side faces of the body member 1 are provided with guiding grooves 8, while the alignment face 9 of the body member 1 that is opposite to the bottom plate member 6 is provided with four alignment cam members 10a and 10b, distributed such that in each case two opposite alignment cam members 10a and 10b, respectively, exactly determine the X- and the Y-direction. For determining the Z-direction, rest head members 13 are provided in the region of the four corners of the body member 1 whereby those rest head members 13 are responsible for the alignment of the pallet support member in Z-direction.

The alignment cam members 10a and 10b are designed to be resiliently yielding. They are provided with a projection towering above the afore mentioned Z rest surfaces. As can be seen particularly in FIGS. 1 and 2, a narrow slit 14 is provided below each cam member 10a and 10b, respectively, in the related side wall member 1a. That narrow slit can be manufactured, for example, by an electro erosive cutting process. The length and the depth as well as the shape of these narrow slits 14 determine the elasticity of the cam members 10*a* and 10*b*, respectively, located there above. The narrow slits 14 are arranged with regard to the vertical symmetry plane of the cam members 10*a* and 10*b*, respectively, such that the two portions 14*a* and 14*b* of the slits extend in opposite directions essentially horizontally, particularly parallel to the outer edge 17 of the alignment surface 9.

Figure 3:
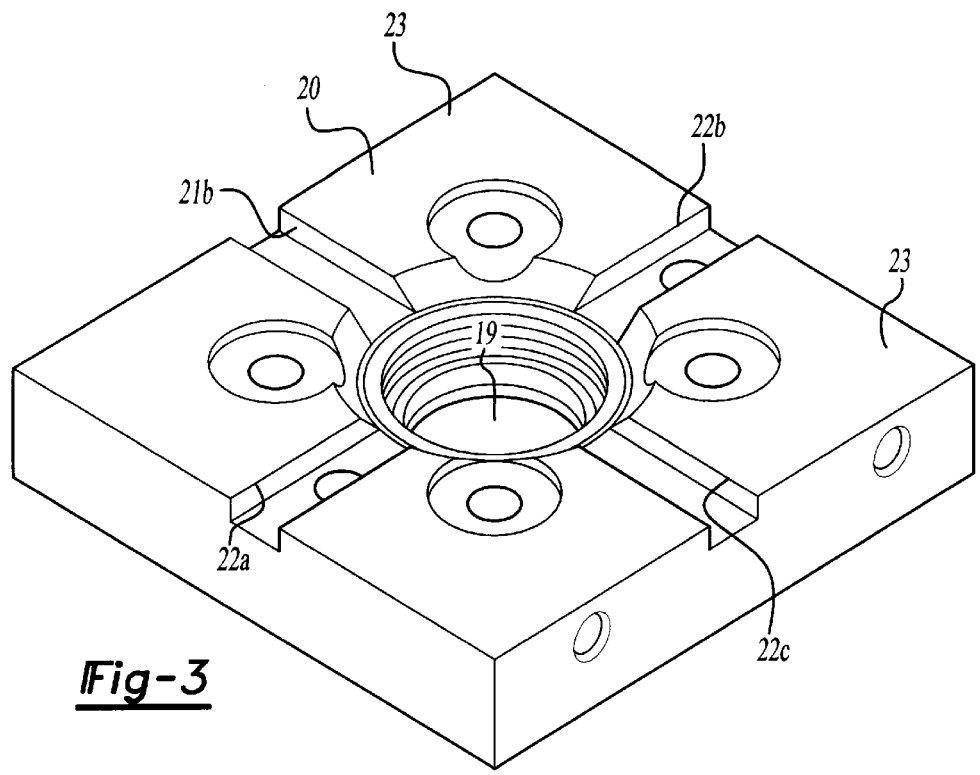
FIG. 3 shows a perspective view of a pallet member.

Belonging to the coupling assembly is the pallet 18 that is shown in FIG. 3 and that serves as a work piece carrier or for carrying and arbitrary device. The pallet 18 has rectangular shape as well and is provided with a connection piece incorporating an aperture 19, located in the center of the pallet 18 and adapted to receive the ball sleeve member 2 of the pallet support member. In order that the pallet 18 may be exactly fixed to the body member 1 of the pallet support member, the coupling surface 20 comprises guiding channels 21*a*, 21*b* and 22*a*, 22*b*, respectively, running perpendicularly to each other and adapted to be engaged by the afore mentioned cam members 10*a* and 10*b*, respectively. The above mentioned guiding channels 21*a*, 21*b* and 22*a*, 22*b*, respectively, serve for determining the XY-orientation of the pallet. As far as the Z-direction is concerned, the pallet is aligned by the recesses cooperating with the rest head members 13 that constitute the bearing surface 23.

Figure 4A:
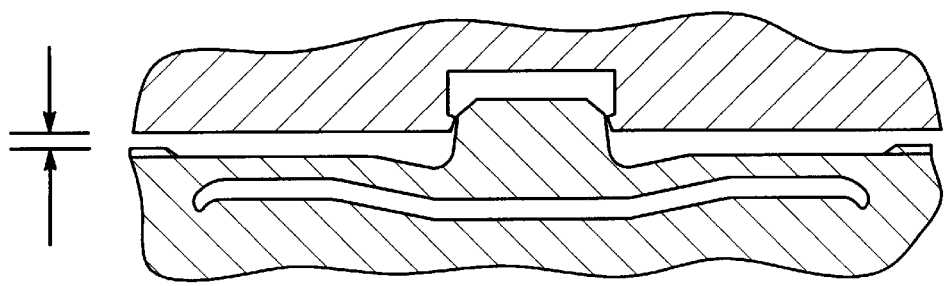
FIGS. 4a and 4b show a cross sectional view of the cam member portion of the pallet support member.

FIG. 4*a* shows a pallet support member with a pallet resting thereon in a not yet clamped state. The slit 14 extends in the pallet body member below the centering cam member. A pallet can be seen resting on the pallet support member.

Figure 4B:
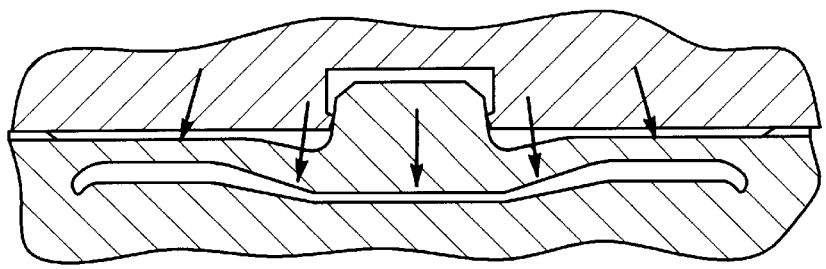

FIG. 4*b* shows the pallet in a clamped state. The pallet is positioned by means of the guiding channels above the centering cam members and is brought into contact with the rest head members. Thereby, the centering cam member resiliently yields in axial direction. The pressure is absorbed by means of the slit 14. In this way, the work piece positioned in the working area of the machine tool can be exactly positioned with regard to the system coordinates.

Upon coupling the pallet support member and the pallet, the slits 14 effect a precise centering of the cam members. Alternatively, it would be possible to design the cam members themselves as being elastically resilient; however, such a solution would be much more complicated and expensive.

The elasticity of the resilient centering assembly, as herein before described, can be matched to the size of the pallet and the work piece, respectively, and to the load to be expected, by appropriately selecting the design of the slits 14.

Figure 5:
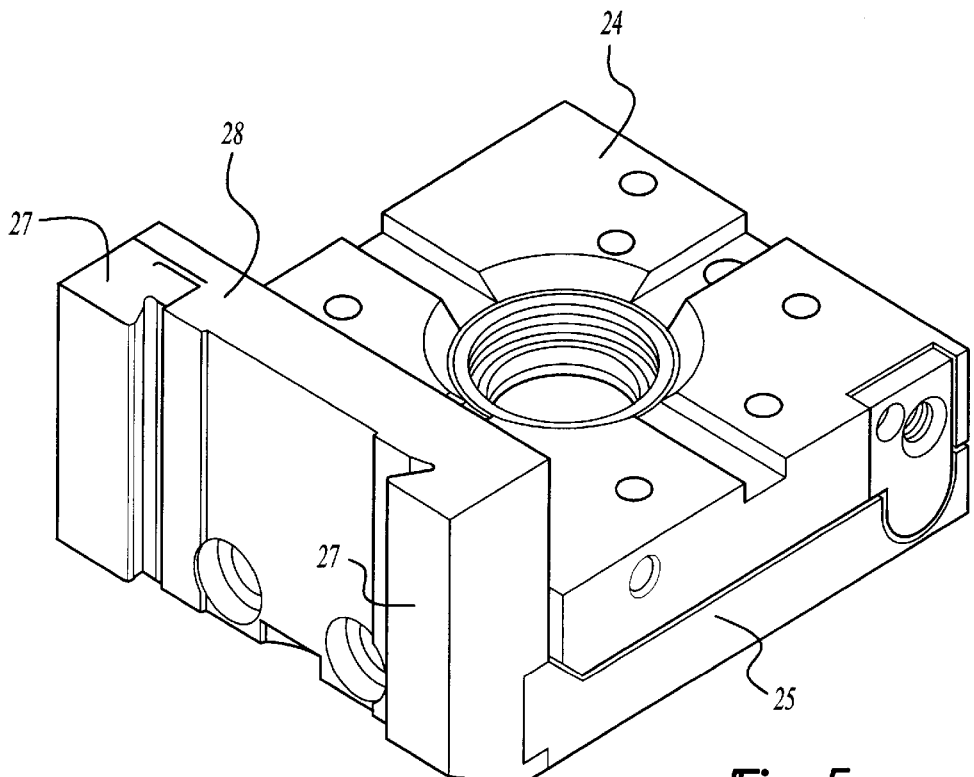
FIG. 5 shows a perspective view of a swiveling pallet member.
Figure 6:
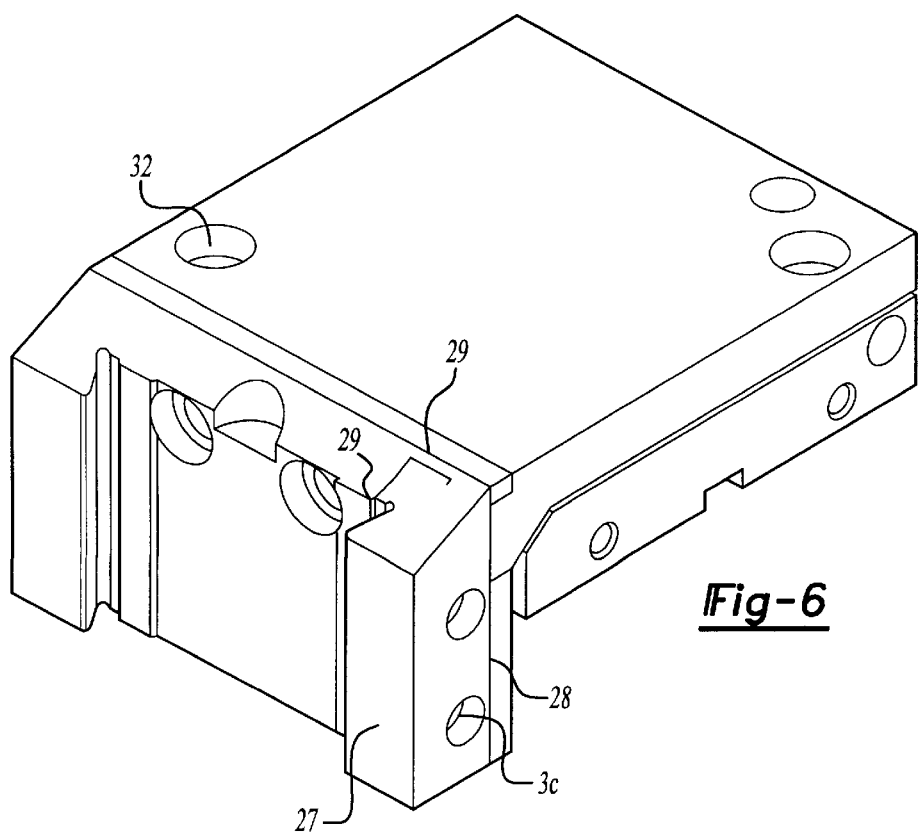
FIG. 6 shows the same swiveling pallet member in a view that is rotated by 180° with regard to FIG. 5.

An embodiment for the application of the solution described herein before is shown in FIGS. 5 and 6; those figures show the use of a swiveling pallet. It comprises a swiveling pallet body member 24 that is designed similar to the pallet 18 of the first embodiment. The pallet body member 24 is located on a swiveling plate member 25. The plate member 25 is provided with a support wall member 26 projecting perpendicularly therefrom and comprising on both sides in each case a guiding rib 27. Together, a dove tail sliding surface guiding assembly is realized. Thus, the height adjustment of the work piece can be performed in a simple manner. Defined within wall member 26 and rib 27 are incisions 28, 29 and 29A. The incisions 28, 29, 29A are preferably manufactured by a wire erosion machining and provide a resilient behavior to the guiding assembly. Particularly, there is inserted a work piece holder with the work piece to be machined and subsequently, its position is aligned in accordance with the required position in which the work piece has to be machined. Bore holes 30 for taking up screws for fixing a work piece within the dovetail shaped clearance between guiding ribs 27 are preferably disposed along at least one side of guiding ribs 27. The swiveling plate member comprises an adjustment plate member 25 that extends essentially perpendicularly to the supporting wall 26. Preferably, in the adjustment plate member 25, biased spring packages 32 are located which enable the positioning and leveling of the pallet within very narrow limits. This is of particular importance with regard to a collision free alignment with respect to the so-called zero-line, i.e. the cutting height "zero".

With the help of the solution described herein above, a reliable and perfect support is achieved, whereby any vibration of the elements is avoided and a precise machining of the work piece is ensured. Moreover, the coupling assembly can be released easily and in a simple manner.

What is claimed is:

1. A coupling assembly to be used in a machine tool for mounting a work piece to be machined in a torsionally fixed manner, comprising:

a pallet adapted to hold said work piece to be machined, said pallet having guide channels;

a pallet support, said pallet being positioned on said pallet support, said pallet support comprising:

an alignment surface for aligning said pallet with regard to said pallet support, said alignment surface having a plurality of alignment cams, said plurality of cams having base portions and incisions disposed below said base portions, said incisions providing for a resilient yielding of the related alignment cams, said cams being disposed such that two opposite cams cooperate with said guide channels; and a plurality of rest heads located substantially in the corners of said alignment surface;

a swiveling pallet, said pallet support being operationally coupled to said swiveling pallet, said swiveling pallet comprising a support wall perpendicularly mount to said pallet support means and a guide, said guide comprising a sliding surface having a dove-tailed shape and having incisions that provide for a resilient behavior of said guide.

2. A coupling assembly according to claim 1 in which said incisions disposed below said base portions of said cams are associated with said alignment cams, said incisions extending in essentially horizontal direction.

3. A coupling assembly according to claim 1 wherein said incisions of said guide run along said sliding surface.

4. A coupling assembly according to claim 1 wherein said swiveling pallet further comprises an adjustment plate, said adjustment plate having at least one biased spring packet to permit fine adjustment and leveling of said swiveling pallet.

* * * * *

UNITED STATES PATENT AND TRADEMARK OFFICE
CERTIFICATE OF CORRECTION

PATENT NO.   : 6,152,436
DATED        : November 28, 2000
INVENTOR(S)  : Peter Sonderegger It is certified that error appears in the above-identified patent and that said Letters Patent is hereby corrected as shown below:

Column 4,
Line 42, replace "comers" with -- corners --.

Signed and Sealed this

Twenty-third Day of October, 2001

Attest:

*Nicholas P. Godici*

NICHOLAS P. GODICI
*Attesting Officer*   *Acting Director of the United States Patent and Trademark Office*